United States Patent
Hu et al.

(10) Patent No.: US 8,989,065 B2
(45) Date of Patent: Mar. 24, 2015

(54) RELAYING DATA IN A COMMUNICATION SYSTEM

(75) Inventors: Honglin Hu, Shanghai (CN); Haifeng Wang, Shanghai (CN); Bin Zhou, Shanghai (CN)

(73) Assignee: Nokia Siemens Networks Oy, Espoo (FI)

( * ) Notice: Subject to any disclaimer, the term of this patent is extended or adjusted under 35 U.S.C. 154(b) by 133 days.

(21) Appl. No.: 12/680,259

(22) PCT Filed: Oct. 1, 2007

(86) PCT No.: PCT/IB2007/002959
§ 371 (c)(1),
(2), (4) Date: Apr. 15, 2010

(87) PCT Pub. No.: WO2009/044223
PCT Pub. Date: Apr. 9, 2009

(65) Prior Publication Data
US 2010/0214930 A1  Aug. 26, 2010

(51) Int. Cl.
| H04B 7/00 | (2006.01) |
| H04W 40/22 | (2009.01) |
| H04B 7/155 | (2006.01) |
| H04B 7/26 | (2006.01) |
| H04L 12/28 | (2006.01) |
| H04L 12/56 | (2006.01) |
| H04M 1/00 | (2006.01) |
| H04W 40/28 | (2009.01) |
| H04W 88/04 | (2009.01) |

(52) U.S. Cl.
CPC .............. *H04W 40/22* (2013.01); *H04B 7/155* (2013.01); *H04B 7/2606* (2013.01); *H04W 40/28* (2013.01); *H04W 88/04* (2013.01)

USPC .................. 370/310; 370/395.4; 455/574

(58) Field of Classification Search
CPC .... H04B 7/2606; H04W 40/22; H04W 40/28; H04W 88/08
USPC ............ 370/310–313, 395.4, 395.41, 395.42; 455/574
See application file for complete search history.

(56) References Cited

U.S. PATENT DOCUMENTS

| 2005/0265360 A1* | 12/2005 | Kim et al. ..................... 370/400 |
| 2007/0155391 A1 | 7/2007 | Kang et al. ..................... 455/450 |
| 2007/0213065 A1 | 9/2007 | Kang et al. ..................... 455/442 |

(Continued)

FOREIGN PATENT DOCUMENTS

| EP | 1 806 945 A2 | 7/2007 |
| WO | WO 2004/107693 A1 | 12/2004 |
| WO | WO2007068999 A1 | 6/2007 |

OTHER PUBLICATIONS

XP-002359226; IST-2003-507581 Winner D3.4 version 1.0; WP3—Radio Network Deployment Concepts; „Definition and assessment of relay based cellular deployment concepts for future radio scenarios considering 1$^{st}$ protocol characteristics; pp. 118; Abdulkarem Adinoyi et al; Jun. 30, 2005 (118 pages).

*Primary Examiner* — Xavier Szewai Wong
(74) *Attorney, Agent, or Firm* — Harrington & Smith

(57) ABSTRACT

The disclosure relates to communication of data in a wireless communication system that enables relaying of data between an originating node (3) and a destined node (1). In the arrangement information of a radio resource allocated to the destined node is provided where after communications on the allocated resource are monitored. Relaying of data between the originating node (3) and the destined node (1) is controlled based on the monitoring.

37 Claims, 6 Drawing Sheets

(56) References Cited

U.S. PATENT DOCUMENTS

2008/0049718 A1* 2/2008 Chindapol et al. ............ 370/351
2008/0198789 A1* 8/2008 Brown et al. .................. 370/315
2010/0189048 A1* 7/2010 Baker et al. ................... 370/329

* cited by examiner

| T1 | CQI Probing | T2 | Feeding | T3 | Delivery | T4 |

RELAYING DATA IN A COMMUNICATION SYSTEM

TECHNICAL FIELD

This disclosure relates to relaying of data in a communication system and in particular to relaying of data between communication entities, for example between a base station and a user communication device, of a communication system.

BACKGROUND

A communication system is a facility which facilitates communication between two or more entities such as communication devices, network entities and other nodes. A communication system may be provided by one or more interconnect networks and the elements thereof and a plurality of communication devices, for example user devices. One or more gateway nodes may be provided for interconnecting various networks. For example, a gateway node can be provided between an access network and other communication networks. The communication may comprise, for example, communication of data for carrying communications such as voice, electronic mail (email), text message, multimedia and so on.

A communication system typically operates in accordance with a standard and/or a set of specifications and protocols which set out what the various elements of the system are permitted to do and how that should be achieved. For example, it is typically defined if the user, or more precisely a user device, is provided with a circuit switched bearer or a packet switched bearer, or both. Also, the manner user communication devices can access a communication system is typically defined, as it the manner in which communications should be implemented between the user device and various elements of the communication system. The functions and responsibilities of various entities are also typically defined by communication protocols. Various functions and features are typically, although not necessarily, arranged in a hierarchical or layered structure, so called protocol stack, wherein the higher level layers can influence the operation of the lower level functions.

A user may communicate via a communication system and access various applications by means of an appropriate communication device. The user communication devices are often referred to as user equipment (UE). An appropriate access system allows the communication device to communicate via the communication system. An access to the communications system may be provided by means of a fixed line or wireless communication interface, or a combination of these. Examples of wireless systems include cellular networks, various wireless local area networks (WLANs), wireless personal area networks (WPANs), satellite based communication systems and various combinations of these.

In wireless systems a network entity such as a base station provides an access node for communication devices. It is noted that in certain systems a base station is called 'Node B'. Typically the operation of a base station node and other apparatus of an access system required for the communication is controlled by an appropriate control entity. The control entity can be interconnected with other control entities of the communication network.

A way of enhancing the coverage and/or throughput of a base station is to use at least one relaying node between the base station and the destined node, for example a destined user device. Relay techniques have been intensively studied, for example, in the context of third and fourth generation communication systems, known in shorthand as 3G/B3G/4G networks. By employing relaying techniques on fixed and mobile relay nodes (RN), the coverage and the throughput of the networks can be increased. Mobile user communication devices can be used as mobile relays to further improve the performance of the networks. In the current cellular network systems a large amount of suitable mobile relay nodes can exist at the same time in a cell. Time division duplex (TDD) mode is often used for relaying communications to the destination device, but this is not the only option.

A scheme known as Inducing Multi-user Diversity Relaying (IMDR) has been proposed for handling the various aspects of relaying by the relay nodes in a cell. The IMDR uses a broadcast feature of a wireless channel to induce multi-user diversity through a two-phase process. In the first phase, known as the feeding phase, data-units are broadcasted by a base station (BS) with its maximum bit-rate and transmit power. It is assumed that at least some user devices in the cell coverage area are likely to receive these data-units. These user devices can then act as mobile relays in the second phase, known as the delivery phase. All user devices which receive a data-unit in the feeding phase act as a relay in the delivery phase. In some disclosures a reference is also made to a three-stage scheme, where a channel quality indicator (CQI) probing phase is provided between the feeding phase and the delivery phase.

It is possible that the destined user device also receives the data directly from the base station. In such a situation the destined user device can send back a positive acknowledgement to the base station. The base station can now determine that the data can be received directly by the destined node without any intermediate i.e. relay nodes. The base station can then broadcast a release command to all relay nodes to instruct the relay nodes to release the relay process. If no positive acknowledgement signalling is received from the destined node, for example during the CQI probing phase, the base station does nothing but is kept inactive. At this stage the relay nodes need to find out the destined node and measure the channel to the destined node. Once the destined node is detected, a hand-shaking can occur between each of the relay nodes and the destined node. Thus, in the IMDR each relay node continuously tracks the quality of the wireless link to the neighbouring users and their identity. In this stage, the relay nodes and the destined node each broadcast signals, and complex hand-shaking protocols are set-up between them to assist in establishing the potential cooperative transmission to the destined node.

The relaying nodes/relaying user devices need to wait until the occurrence of a "good channel" to transmit the data-units into the destination. The transmission occurs with the maximum bit-rate. Transmitting to multiple relay nodes in the first phase induces multi-user diversity into the system that can be exploited in the second-phase, hence the name Inducing Multi-user Diversity Relaying (IMDR).

As mentioned, in the delivery phase the base station is kept inactive. Only transmissions that are allowed are from the relay nodes to the destined node. Upon successful transmission, the destined node sends a positive acknowledgement to the base station. Consequently, the base station broadcasts a release signal where after the relay nodes can release that data-unit. If the base station does not receive an acknowledgement that corresponds to a given data-unit in a predefined time interval, that data-unit is considered lost and a release signal is broadcasted. That lost data-unit may be considered for retransmission later on.

Although the above proposed scheme has proven workable and improved the coverage and efficiency, it also introduces certain disadvantages into the system. In particular, it introduces a signalling overhead between the mobile relay nodes. Thus it would be desired to have a scheme where any excessive signalling overhead could be avoided while the throughput and coverage of a base station can be increased by means of relay nodes. In addition, a scheme that is suitable for a fixed relay station scenario or a scenario when only a few relay nodes are available might also be desired in certain applications.

SUMMARY

The herein described embodiments aim to address one or several of the above shortcomings.

According to an embodiment, there is provided a communication node for a communication system, comprising a transmitter for transmitting information relating to a radio resource that is allocated to a destined node, a receiver for receiving communications on the allocated radio resource from the destined node, and a controller configured to allocate radio resources and to control, based on communications on the allocated resource from the destined node, data relaying process between the data communication node and the destined node.

In accordance with another embodiment there is provided a relay node for communicating system, comprising a receiver configured to receive information of a radio resource allocated to a destined node and communications on the allocated radio resource, a transmitter configured to communicate with other nodes, and a controller configured to monitor for communications on the allocated resource by the destined node and to control relaying of data, between the originating node and the destined node based on the monitoring.

In accordance with another embodiment there is provided a method for communicating data in a wireless communication system enabling relaying of data between an originating node and a destined node, the method comprising providing information of a radio resource allocated to the destined node, monitoring for communications on the allocated resource from the destined node, and controlling relaying of data between the originating node and the destined node based on the monitoring.

An embodiment provides a computer program comprising program code means adapted to perform the method.

An embodiment provides a controller for a communications device, configured to monitor for communications on a radio resource that has been allocated to a destined node and to control relaying of data between an originating node and the destined node based on the monitoring.

In accordance with a more specific embodiment a controller is configured to process a pilot signal that is obtained from a broadcasting by a destined node on the allocated radio resource.

A communication node can be configured to communicate information about the allocated radio resource to at least one relay node. Information of at least one of a destined node identity and a quality of service (QoS) requirement may also be communicated. The information may be provided by broadcasting.

A lesser than available number of relay nodes may be instructed to relay data to a destined node. Scheduling instructions may be provided to relay nodes for communication with a destined node.

At least one decision regarding relaying of data to a destined node may be made based on communication by the destined node on the allocated radio resource before delivery of data to at least one relay node.

An appropriate manner of communication with a destined node may be determined based on communication on the allocated radio resource and/or feedback information from at least one relay node.

A radio subband resource may be allocated for sole use by a destined node while communications on other subbands are allowed.

A relay node controller may be configured to determine information relating to a parameter indicative of the quality of a radio channel between the relay node and a destined node and to compare the parameter with a threshold. The controller may determine a value of the parameter based on the communications on the allocated resource. The controller may be configured to determine, based on communications on the allocated resource, if the relay node is capable of taking part in relaying of data to the destined node, and/or if the relay node needs to take part in relaying data between to the destined node, and/or if the relay node shall refrain from relaying of data to the destined node. The controller may determine, based on an acknowledgement message by the destined node, that relaying of data is not needed.

BRIEF DESCRIPTION OF THE DRAWINGS

For a better understanding of the present invention and how the same may be carried into effect, reference will now be made by way of example only to the accompanying drawings in which.

DETAILED DESCRIPTION

Figures 1, 2:
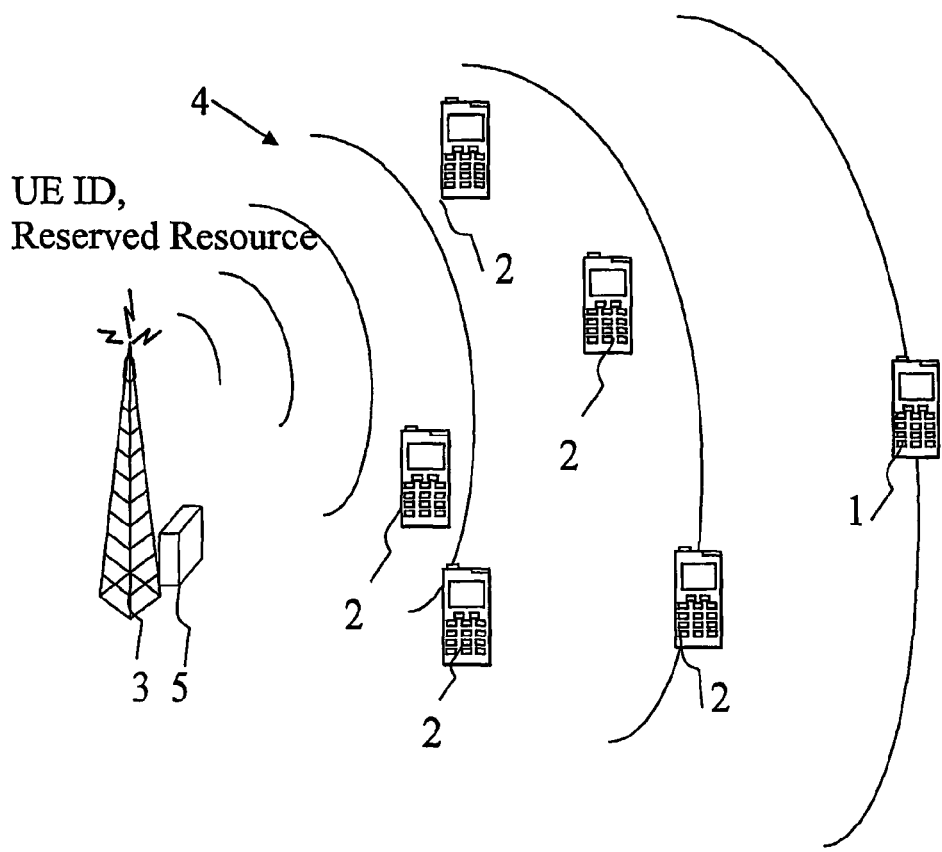
FIG. 1 shows a schematic presentation of a communication system wherein the invention may be embodied.
FIG. 2 shows a timing chart for operation in accordance with an embodiment.
Figure 3:
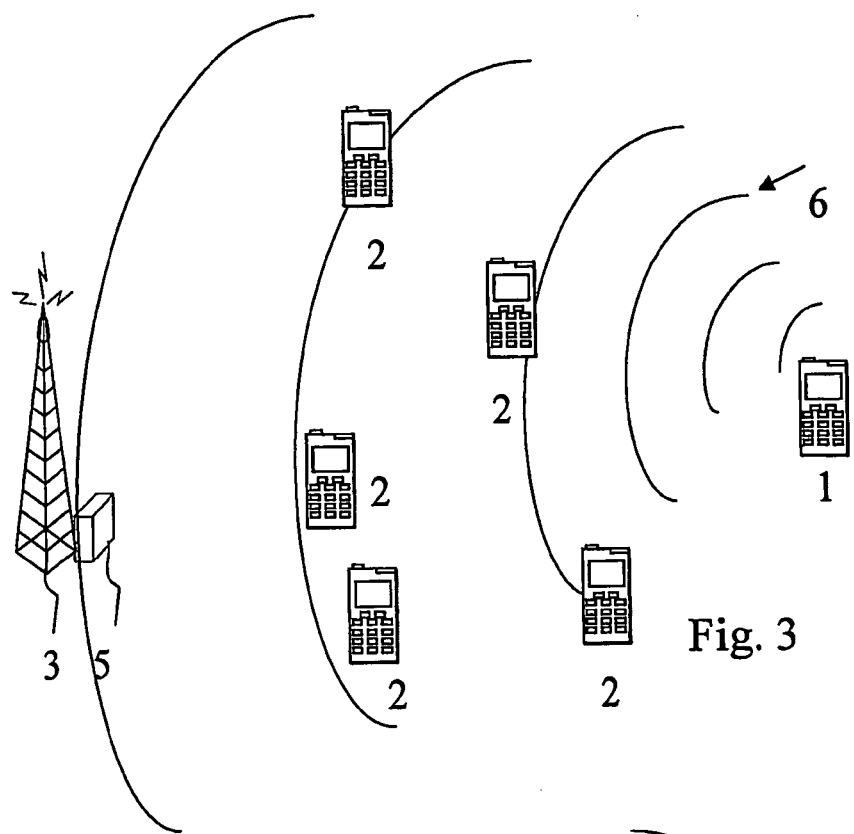
FIGS. 3 to 8 show schematically the progress of relaying data to a destined node in accordance with an embodiment.
Figure 4:
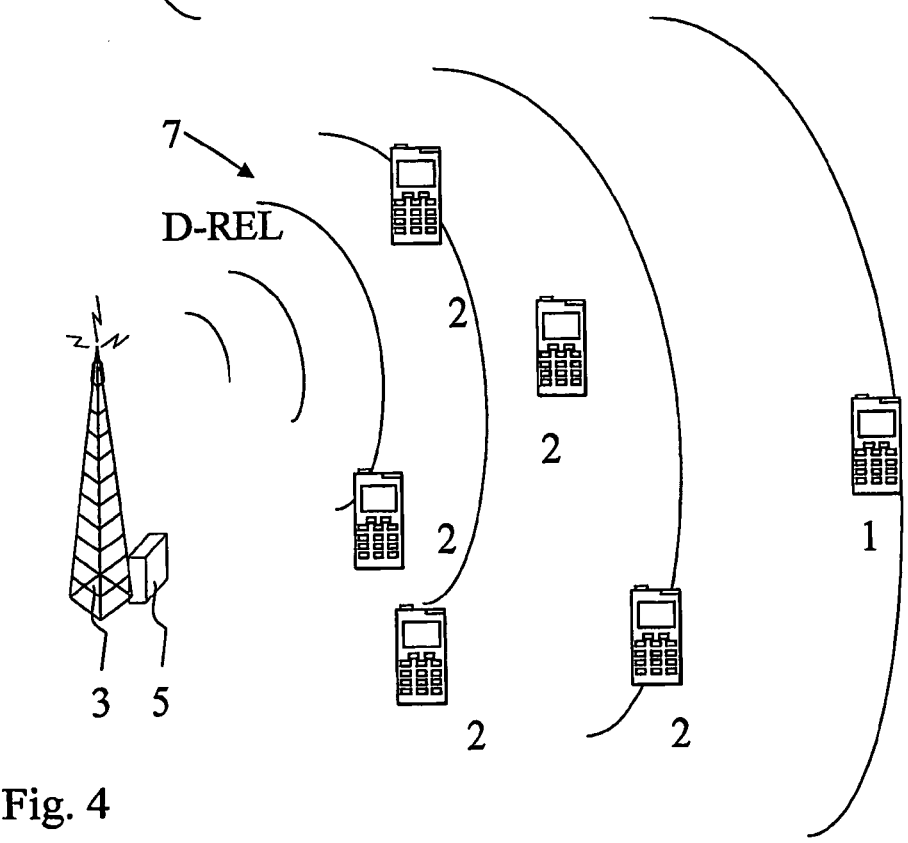

Before explaining in detail a few exemplifying embodiments, a brief explanation of certain general principles of wirelessly communicating data is given with reference to FIG. 1.

A communication device, for example a user device, can be used for accessing various services and/or applications provided via a communications system. In wireless or mobile systems the access is typically provided via an access interface between a user device 1, 2 and an appropriate wireless access system. A user device can typically access wirelessly a communication system via at least one base station 3 or similar wireless transmitter and/or receiver node. Non-limiting examples of access nodes are a base station of a cellular system and a base station of a wireless local area network (WLAN). Each user device may have one or more radio channels open at the same time and may be connected to more than one base station.

The user devices 1 and 2 may also communicate directly with each other. The communication may be arranged in various manners based on any appropriate radio technology. For example, radio channels similar to those used for communication between a base station and a user device or appropriate short range links, for example those based on the Bluetooth™ protocol, may be used for communication between the user devices.

The base station 3 can be connected to a data network via appropriate gateway arrangement comprising one or more appropriate gateway nodes, for example a packet data gateway and/or an access gateway. A base station is typically controlled by at least one appropriate controller entity, generally denoted by 5 in FIG. 1. The controller entity 5 can be provided for managing of the overall operation of the base station and/or communications via the base station. The controller entity is typically provided with memory capacity and at least one data processor. Various functional entities may be provided in the controller by means of the data processing capability thereof. The functional entities provided in the base station controller may provide functions relating to radio resource control, access control, packet data context control, relay control and so forth.

The user device 1, 2 can be used for various tasks such as making and receiving phone calls, for receiving and sending data from and to a data network and for experiencing, for example, multimedia or other content. For example, a user device may access applications provided via a data network, such as applications that are provided based on the Internet Protocol (IP) or any other appropriate protocol. An appropriate mobile user device may be provided by any device capable of at least sending or receiving radio signals. Non-limiting examples include a mobile station (MS), a portable computer provided with a wireless interface card or other wireless interface facility, personal data assistant (PDA) provided with wireless communication capabilities, or any combinations of these or the like.

Although not shown for clarity, a user device is typically provided with at least one data processing entity and at least one memory for use in tasks it is designed to perform. The data processing and storage entities can be provided on an appropriate circuit board and/or in chipsets.

In addition to directly communicating with the base station, a user device 1 can communicate with one or more relaying user devices, or relaying nodes 2. In the herein described embodiments data can be relayed from an originating node, for example the base station (BS) 3 of FIG. 1, to a destined node, for example the user communication device 1 of FIG. 1, via at least one relay node, for example any of the communication devices 2 of FIG. 1.

The relaying can be provided only if this is determined appropriate based on signalling received from the destined node. In order to be able to make decisions in this regard relatively early in the relaying process and to enable the destined user device to be engaged in the decision making and communication link set-up procedure, the destined communication device 1 is allocated a reserved radio resource. The radio resource allocation can be provided by the base station in any appropriate manner, depending on the radio technology used by the destined node. The destined node can use the allocated radio resource for broadcasting pilot signals, or for other purposes such as communications relating to random access. The pilot signals can be received and utilised by the base station and/or the relay nodes for example in manners described in detail below.

Information regarding the allocation and information derivable from the pilot signals or other signals on the allocated radio resource can be utilised by the base station node and also by the other nodes in deciding how to handle the relaying process. For example, the relay nodes 2 can use the signals to determine relatively early whether there is a need to take part or even if the particular relay node can take part in relaying of data between the destined node 1 and the base station 3. A relay node 2 can determine from a pilot signal, inter alia, the quality of the radio channel between it and the destined node. The base station can also determine based on the signal an appropriate manner of communication with the destined node, for example if relaying is needed or if the data shall be communicated directly to the destined node.

The possibility of sending signals on a reserved radio resource enables the destined node 1 to be engaged in and/or influence procedures such as the decision making and/or setting up the network of relaying communication devices 2 between itself and the base station 3. This may simplify handshaking and measurement operations that are used in setting up a relaying path for delivering data between a base station and a user communication device. In the embodiments multi-user diversity can be achieved in a relatively simple manner by reserving opportunities for the destined node to send signals on a known resource.

An example for a time-span for the scheme of FIGS. 1 and 3 to 8 is illustrated in FIG. 2. As shown in FIG. 2, a channel quality indicator (CQI) probing step precedes a feeding step and a delivery step. A procedure according to this embodiment is now explained in greater detail in the following with reference to FIGS. 1 to 8.

In FIG. 1 the base station 3 broadcasts, during time interval T1 of FIG. 2, information 4 relating to a destined user device 1 such as a destined user equipment identity (UE ID), quality of service (QoS) requirement and so on. In addition, information regarding the radio resource reserved for the destined user device is also broadcast in information 4. The reserved resource can be, for example, a reserved time-frequency radio resource of a time division duplex (TDD) system.

If the destined user device 1 is within the coverage area of the base station 3, the broadcasted control signalling will reach also the destined user device 1. Upon receipt of the broadcast information 4 the destined user device 1 can in turn broadcast its pilots on the reserved radio resource, as denoted by reference 6 in FIG. 3. This can occur during the CQI probing phase preceding a data feeding phase.

At this stage the relay nodes 2 can also probe their communication channels to the destined user device 1 to assess the quality and possibly other characteristics of the channels.

It is noted that in this stage the base station 3 does not need to be inactive as would be the case in the conventional IMDR relaying scheme described above. Instead, the base station 3 needs only to be inactive, i.e. not send anything, on the reserved radio resource assigned to the destined user device 1. For example, if orthogonal frequency division multiple access (OFDMA) is used, the base station only needs to avoid using the dedicated subcarriers assigned to the destined node for CQI probing. Because only 1 sub-band typically needs to be reserved for the destined user device 1, the other n−1 sub-bands can be used for other purposes and thus the spectrum efficiency is enhanced. Moreover, there is no need at this stage for any complex hand-shaking protocols between the relay nodes 2 and the destined node 1.

The process enters then stage T2, and the feeding phase. The base station 3 may have received a pilot 6 from the destined user device during the CQI probing phase. If so, the controller 5 of the base station 3 can determine that data can be communicated directly to the user device 1, rather than by relaying. In response to this determination the base station 3 can broadcast a release announcement (e.g. a D-REL message) 7 to all relay nodes 2, see FIG. 4. The relay nodes can then release the relay process.

Figure 5:
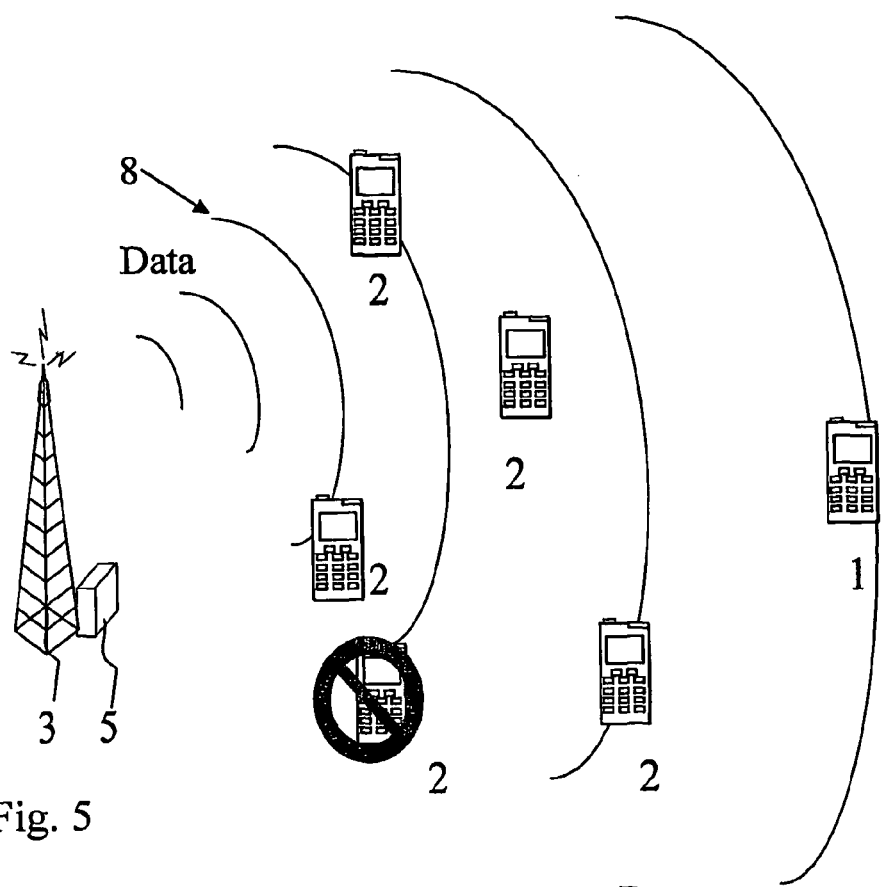

If the base station controller 5 determines that relaying is needed for the destined user device 1, the base station 3 can broadcast the data intended for the destined user device 1 to the relay nodes 2, as shown in FIG. 5. The determination may be based on the realisation that no pilot or other signalling was received from the destine device 1 on the reserved resource, or that the received signalling was too weak or otherwise of poor quality, or based on some other criteria.

The broadcasting from the base station 3 may occur with the maximum bit-rate and maximum transmit power. It is noted that since the relay nodes 2 are aware of the channel information associated with the destined node 1, the relay nodes who cannot offer relaying to the destined node can be made inactive in this specific relaying process. Since all relay nodes can have been made aware already at this stage whether they can offer relay or not, only those relay nodes that have determined that they can act as a relay node buffer and/or decode the received data. The other relay nodes can ignore the broadcasting, and thus reduce the overhead. That is, the arrangement can be such that only those relay nodes that are capable of satisfactorily communicating with the destined node 1 receive and process the data from the base station, while any relay nodes that have determined themselves as being incapable for such communication simply ignore the relaying process.

According to an alternative, if a relaying node 2 finds that it is suitable for acting as a relay for the destined node 1, for example by evaluating the channel from the base station 3 and the channel to the destined node, it can report itself to the base station 3 and request for more sophisticated scheduling instructions. This may occur e.g. during phase T2 of FIG. 2. Relay nodes who find their channel to be worse than a predetermined threshold can remain silent. Alternatively, those relay nodes who determine themselves incapable report this to the base station.

Consequently in the feeding phase the base station 3 can then send data to only to selected relay nodes by dedicated channels, rather than through a broadcasting channel. This may assist in increasing capacity in the cell, since a broadcasting channel normally cannot support large amounts of dedicated data for a specific destine node, the dedicated channels presenting less limitation in this regard. Moreover, scheduling and use of dedicated channels enables a base station controller to more easily and centrally manage advanced cooperative relaying schemes among the selected relay nodes. Also, the overhead may be reduced because not all available nodes signal the same data to the destined node. Also, it is possible to control the number of relay nodes, for example by changing the threshold and/or by control instructions from the base station instructing only a selected number of relay nodes to relay the data.

Embodiment enabling base station to control the relaying may be especially useful for a scenario where only a relatively small number of relay nodes exists near the destined user device or for a fixed relay node scenario. This may be so in particular because it is possible that none of the relay nodes can act as a relay for the destined node. If the base station can receive feedback from candidate relay nodes, the base station can decide whether it needs to broadcast the data to the destined node, if relaying can be used, or if some other action needs to be taken. Thus any useless feeding/broadcasting can be avoided.

Figure 6:
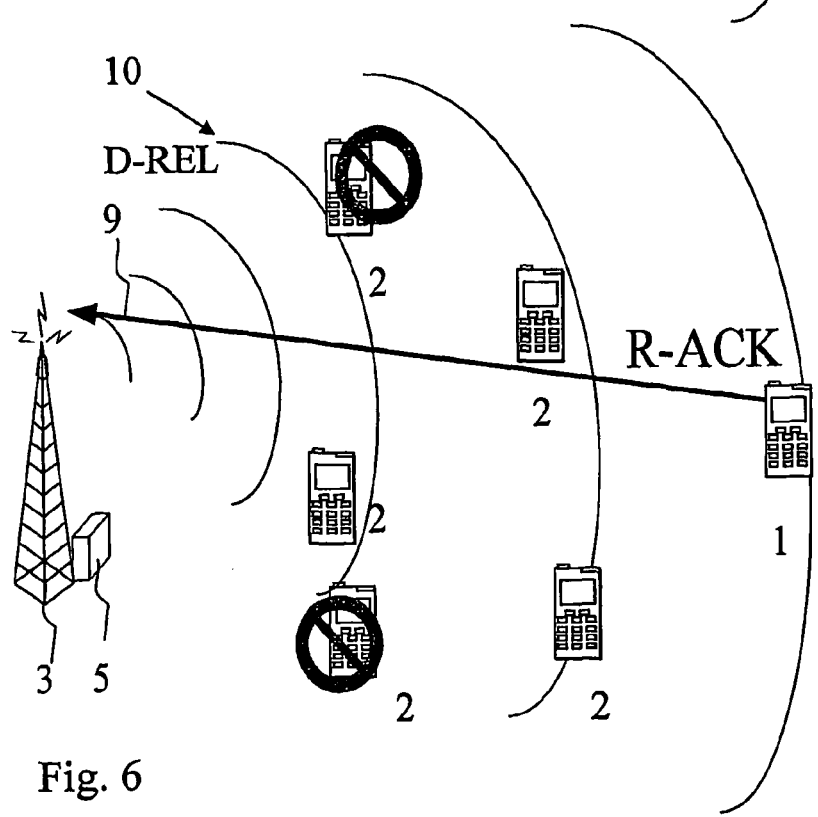

During time period T3 of FIG. 2 data 8 is transmitted i.e. delivered from the base station 3 to the relay nodes 2. The destined node 1 may also receive the data from this transmission. If the destined node 1 successfully receives the data from this transmission, it can send an acknowledgement (e.g. an R-ACK message) 9 to the base station, as shown in FIG. 6. The base station 3 can then determine that relaying is not required and in response to this determination broadcast a release indication (e.g. a D-REL) 10 to the relay nodes 2. Upon receipt of the release indication, the relay nodes can release the relay process.

According to an embodiment, if the relay nodes 2 hear the R-ACKs or other positive acknowledgements 9 send by the destined node 1, the relay nodes may be allowed to release the relaying process immediately without a need to wait for instructions from the base station 3.

If a relay node does not receive within a predetermined period any indication that the relay process can be released, establishment of hand-shaking connections between the relay node and the destined node follows. Thus each relay node can then, without any further instructions, start to prepare for relaying of data to the destined node.

Figure 7:
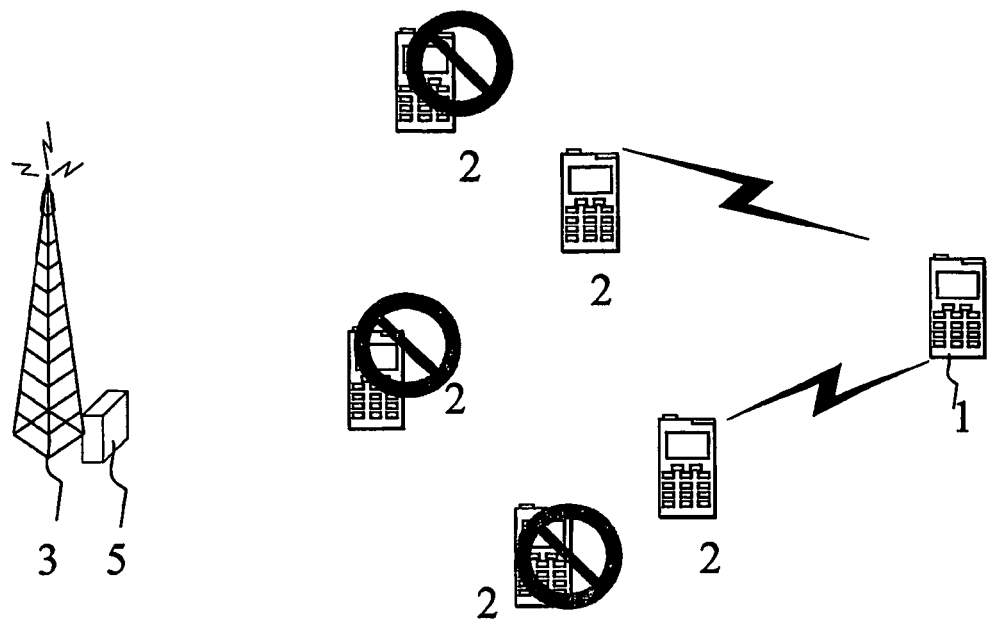

The delivery phase from the capable relay nodes 2 to the destined node 1 is shown in FIG. 7. The base station 3 can be kept inactive at this stage, and thus transmissions from the relay nodes 2 to the final destined node or destined user device 1 can be the only active transmissions at this time. In some embodiments the base station and/or other nodes may be allowed to communicate in other subchannels than the ones used for communication towards the destined node.

In accordance with an embodiment it is monitored if at least one relay node 2 is able to achieve a transmission bit-rate that is greater than or at least equal to a predetermined system parameter $R_0$ over the channel to the destined node where after that at least one relay node is used for transmitting the data-units to the destined node. The decision making can thus be distributed amongst the relay nodes such that each relay node makes a decision if it can transmit by checking if it can meet a predetermined quality threshold.

According to an embodiment the base station controller 5 centrally decides which relay nodes 2 shall transmit the data towards the destined node 1. The decision can be made based on reports from the relaying user devices or some other criteria.

Medium access control (MAC) used for access control can be either a contention-based method or a base station coordinated non-contention based method.

Figure 8:
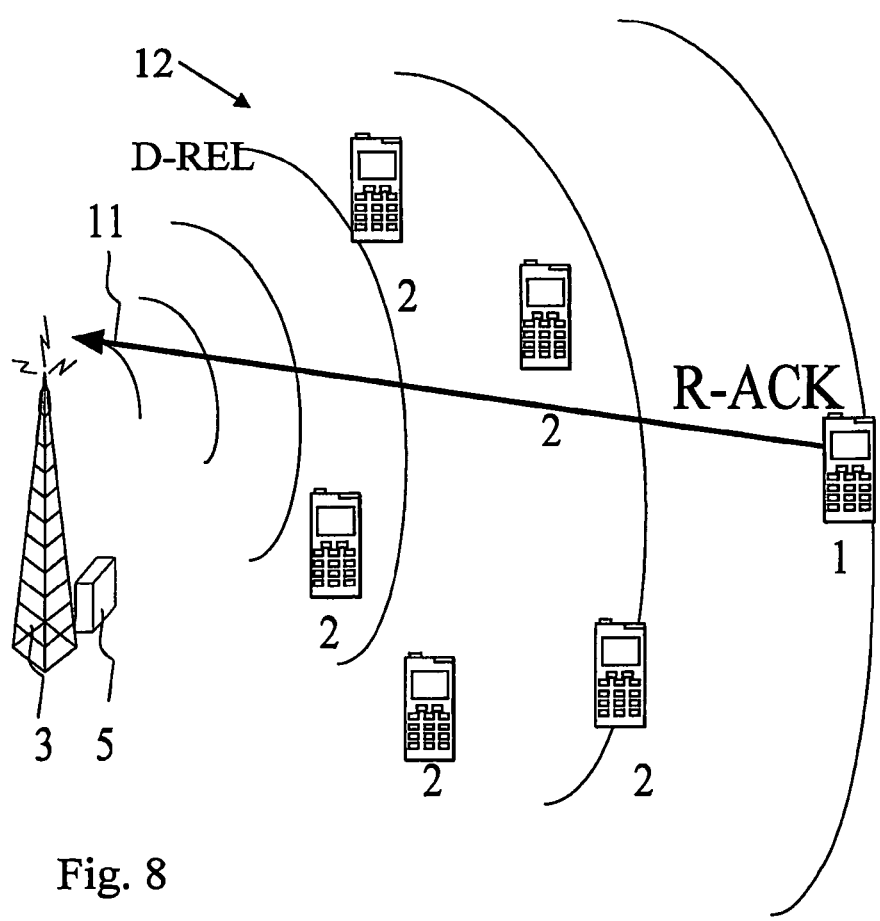

In period T4 of FIG. 2, upon a successful transmission, the destined user device 1 sends an acknowledgement signal (e.g. R-ACK) 11 to the base station 3, as shown in FIG. 8. The acknowledgement may be communicated either directly from the destined node 1 or via any of the relay nodes. Consequently, the base station 3 broadcasts a release indication (e.g. D-REL) signal 12. The relay nodes 2 then release the particular data-unit.

If the relay nodes can hear the acknowledgement 11 sent from the destined user device 1, they can be allowed to release the relaying process directly without waiting for instructions from the base station 3. If the base station 3 does not receive a positive acknowledgement from the destined node 1 that corresponds to a given data-unit in a predefined time interval, that data-unit is considered as being lost. A release signal can then be broadcasted by the base station. That data-unit may be considered for retransmission later.

Figure 9:
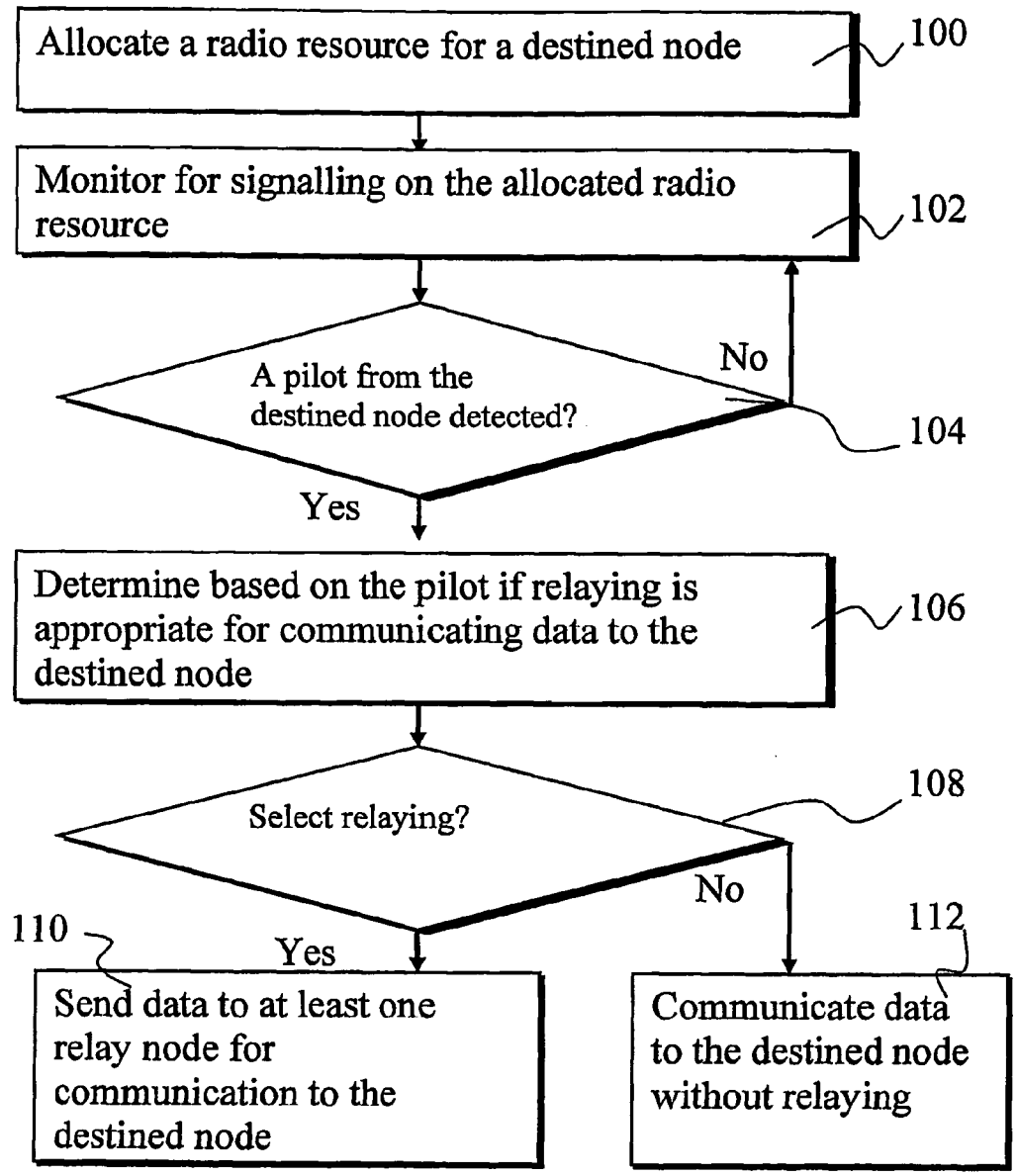
FIGS. 9 and 10 show flowcharts in accordance with certain embodiments.

An example of operation in an originating node is described below with reference to the flowchart of FIG. 9. At step 100 a radio resource is allocated for a destined node. The allocation may be provided by the originating or sending node, for example a base station or any other node that has data to be send to another node in a communication system. Information about the allocation may then be appropriately communicated to at least the destined node, and possibly also to any possible relay node. The originating node, and possibly other nodes in the system, then monitor at 102 for signalling by the destined node on the allocated radio resource. A pilot or other signal from the destined node may be detected at 104. Upon detection it is determined at 106 if relaying is to be used for communication of data to the destined node. For example, it can be determined if the quality of the signal is good enough or the traffic conditions in the communication system are otherwise such that it is more appropriate to sent data directly to the destined node. If relaying is selected at 108, data is delivered to at least one relay node for communication to the destined node at 110. If it is decided that relaying is not appropriate, another procedure may follow, for example data is communicated to the destined node without relaying at 112.

Figure 10:
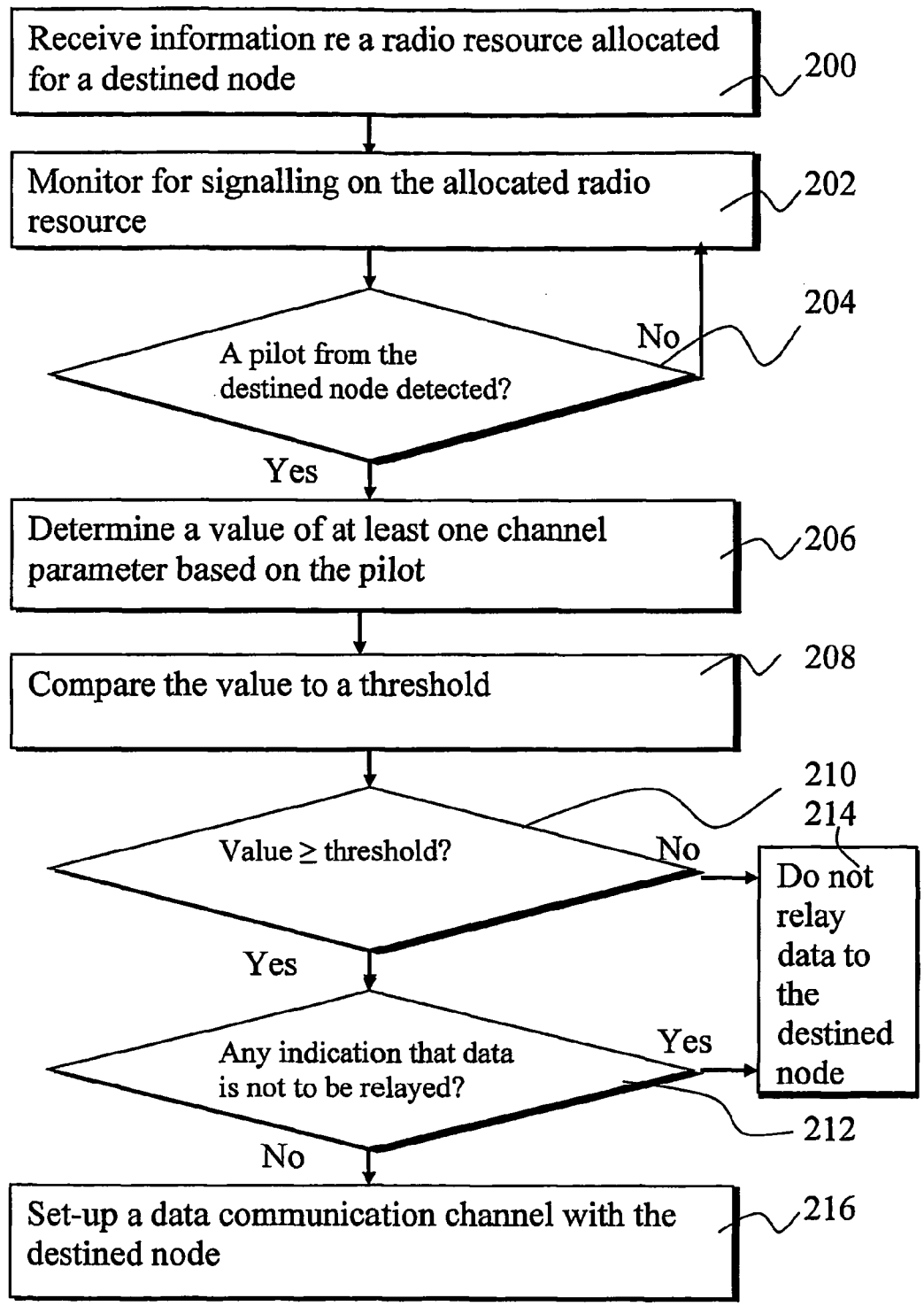

An example of operation in a relay node is described below with reference to the flowchart of FIG. 10. In this embodiment information relating to a radio resource allocated for a destined node is received by a relay node at 200. The relay node then monitors for signalling on the allocated radio resource by the destined node at 202. A pilot or other signal from the destined node may be detected at 204. The relay node may then determine at 206 a value of at least one channel parameter based on the signal. For example, a channel quality indicator may be determined at this stage. A comparison of the value to a threshold can be made at 208. If the value is less than the predetermined threshold, a decision is made at 210 not to participate in relaying of data to the destined node, see 214. The parameter and/or the threshold may be based on a quality of service (QoS) requirement information received from the originating node.

If the value equals to or exceeds the threshold, it is determined at 212 if there is any indication that the relay node shall not be involved in relay of data to the destination node. If such an indication exists, for example a release relay process message is received from the originating node, a decision is made not to participate in relaying of data to the destined node, and the process enters state 214. If no such indication is detected, a data communication channel is set-up with the destined node at 216.

The embodiments may provide various advantages. For example, during a channel quality probing phase complex probing and handshaking protocols among the relay nodes may be avoided. This may lead to use of less time slots/bits for the handshaking operations. Savings in power consumption and reduced interference may also be obtained. Reduction in interference may make the quality probing more accurate. It is possible to arrange the feeding phase such that only capable relay nodes receive a given data-unit from a base station. The other relay nodes can ignore the broadcasting. In the quality probing phase, the base station does not need to be inactive on all radio resources. For example, if orthogonal frequency division multiplexing access (OFDMA) where N subcarriers are provided is used for the radio access, the base station may only need to avoid using the dedicated subcarriers assigned to the destined user device for quality probing. The destined node can be provided with at least have two opportunities to send a positive acknowledgement to the base station during the relaying process thus enabling early termination of the relaying process, if this is appropriate.

The required data processing functions and/or protocol entities may be provided by means of one or more data processors. Appropriate data processing may be provided in a processing unit provided in association with the base station and/or any of the relay and destine nodes. The data processing may be distributed across several data processing modules. The above described functions may be provided by separate processors or by an integrated processor. An appropriately adapted computer program code product or products may be used for implementing the embodiments, when loaded on an appropriate processor, for example in a processor associated with the base station 3 or any of the communications devices 1 and 2. The program code means may, for example, provide timers, perform generation, measurement, monitoring and/or interpretation of information signalled between the various entities and control decision making and/or triggering of various operations. The program code product for providing the operation may be stored on and provided by means of a carrier medium such as a carrier disc, card or tape. A possibility is to download the program code product to the mobile device via a data network.

It is noted that whilst embodiments have been described in relation to relay and destined nodes such as user devices, for example mobile user equipment and originating nodes such as base stations, embodiments of the present invention are applicable to any other suitable type of nodes suitable for communication in a system employing relay nodes for communication of data between two nodes.

It is also noted that although certain embodiments were described above by way of example with reference to certain exemplifying architectures for wireless networks, technologies and standards, embodiments may be applied to any other suitable forms of communication systems than those illustrated and described herein.

It is also noted herein that while the above describes exemplifying embodiments of the invention, there are several variations and modifications which may be made to the disclosed solution without departing from the scope of the present invention.

The invention claimed is:

1. An apparatus, comprising:
at least one processor; and
at least one memory including computer program code, where the at least one memory and the computer program code are configured, with the at least one processor, to cause the apparatus to at least:
transmit from an originating node broadcast information of a radio resource that is allocated to a destined node, wherein the transmitting comprises broadcasting said information to the destined node and at least one relay node, and wherein the radio resource comprises a reserved at least one of a radio frequency and a time resource that is receivable by the originating node and the at least one relay node;
in response to the transmitting, receive communications on the allocated radio resource from the destined node; and
allocate radio resources and control with the originating node, based on the received communications on the allocated resource from the destined node, a data relaying process between the apparatus and the destined node.

2. The apparatus as claimed in claim 1, wherein the at least one memory including the computer program code is configured with the at least one processor to cause the apparatus to process a pilot obtained from a broadcasting by the destined node on the allocated radio resource.

3. The apparatus as claimed in claim 1, wherein the at least one memory including the computer program code is configured with the at least one processor to cause the apparatus to communicate information about the allocated radio resource to the at least one relay node.

4. The apparatus as claimed in claim 3, wherein the at least one memory including the computer program code is configured with the at least one processor to cause the apparatus to communicate information of at least one of a destined node identity and a quality of service requirement to the at least one relay node.

5. The apparatus as claimed in claim 1, wherein the at least one memory including the computer program code is configured with the at least one processor to cause the apparatus to instruct a lesser than available number of relay nodes to relay data to the destined node.

6. The apparatus as claimed in claim 1, wherein the at least one memory including the computer program code is configured with the at least one processor to cause the apparatus to send scheduling instructions to the at least one relay node for communication with the destined node.

7. The apparatus as claimed in claim 1, wherein the at least one memory including the computer program code is configured with the at least one processor to cause the apparatus to make at least one decision regarding relaying of data to the destined node based on communication by the destined node on the allocated radio resource before delivery of data to the at least one relay node.

8. The apparatus as claimed in claim 1, wherein the at least one memory including the computer program code is configured with the at least one processor to cause the apparatus to determine, based on at least one of communication on the allocated radio resource and feedback information from at least one relay node, an appropriate manner of communication with the destined node.

9. The apparatus as claimed in claim 8, wherein the at least one memory including the computer program code is configured with the at least one processor to cause the apparatus to determine if data is communicated on a broadcast channel or a dedicated channel.

10. The apparatus as claimed in claim 1, wherein the at least one memory including the computer program code is configured with the at least one processor to cause the apparatus to broadcast a release relay process indication.

11. The apparatus as claimed in claim 1, wherein the at least one memory including the computer program code is configured with the at least one processor to cause the apparatus to allocate a radio subband resource for sole use by the destined node and to communicate on other subbands.

12. An apparatus, comprising:
at least one processor; and
at least one memory including computer program code, where the at least one memory and the computer program code are configured, with the at least one processor, to cause the apparatus to at least:
receive from an originating node broadcast information of a radio resource allocated to a destined node and communications on the allocated radio resource, wherein the radio resource comprises a reserved at least one of a radio frequency and a time resource that is receivable by the originating node and at least one relay node;
communicate with other nodes; and
monitor for communications on the allocated resource by the destined node and control relaying of data between the originating node and the destined node based on the monitoring.

13. The apparatus as claimed in claim 12, wherein the at least one memory including the computer program code is configured with the at least one processor to cause the apparatus to determine information relating to a parameter indicative of the quality of the radio channel between the apparatus and the destined node and to compare the parameter with a threshold.

14. The apparatus as claimed in claim 13, wherein the at least one memory including the computer program code is configured with the at least one processor to cause the apparatus to determine a value of the parameter based on the communications on the allocated resource.

15. The apparatus as claimed in claim 12, wherein the at least one memory including the computer program code is configured with the at least one processor to cause the apparatus to determine, based on communications on the allocated resource, at least one of:
if the apparatus is configured to take part in relaying of data to the destined node;
if the apparatus needs to take part in relaying data between to the destined node; and
if the apparatus shall refrain from relaying of data to the destined node.

16. The apparatus as claimed in claim 12, wherein the at least one memory including the computer program code is configured with the at least one processor to cause the apparatus is configured to determine, based on an acknowledgement message by the destined node, that relaying of data is not needed.

17. The apparatus as claimed in claim 12, comprising a mobile user device.

18. A method, comprising:
providing by an originating node, broadcast information of a radio resource allocated to a destined node in a wireless communication system, wherein the providing comprises broadcasting said information to the destined node and at least one relay node, and wherein the radio resource comprises a reserved at least one of a radio frequency and a time resource that is receivable by the originating node and the at least one relay node;
monitoring for communications on the allocated resource from the destined node; and
controlling relaying of data between the originating node and the destined node based on the monitoring.

19. The method as claimed in claim 18, wherein the communications comprise broadcasting by the destined node on the allocated radio resource.

20. The method as claimed in claim 18, wherein the communications on the allocated resource comprise communication of a pilot signal.

21. The method as claimed in claim 18, comprising communicating information about the allocated radio resource to the at least one relay node.

22. The method as claimed in claim 21, further comprising communication of information of at least one of a destined node identity and a quality of service requirement.

23. The method as claimed in claim 18, comprising determining, at the at least one relay node, based on communications on the allocated resource, at least one of
if the at least one relay node is configured to take part in relaying of data between the originating node and the destined node;
if the at least one relay node needs to take part in relaying data between the originating node and the destined node; and
if the at least one relay node shall refrain from relaying of data between the originating node and the destined node.

24. The method as claimed in claim 18, comprising determining the quality of a radio channel between the at least one relay node and the destined node based on the communications on the allocated resource.

25. The method as claimed in claim 24, comprising determining if achievable transmission bit-rate equals to or is greater than a threshold.

26. The method as claimed in claim 18, comprising instructing a lesser number of relay nodes than is available to relay data to the destined node.

27. The method as claimed in claim 18, comprising providing scheduling instructions by the originating node.

28. The method as claimed in claim 18, comprising making at least one decision regarding the relay process based on communication by the destined node on the allocated radio resource before delivery of data to the at least one relay node.

29. The method as claimed in claim 18, comprising determining, based on at least one of communication on the allocated radio resource and feedback information from the at least one relay node, an appropriate manner of communication with the destined node.

30. The method as claimed in claim 18, comprising broadcasting from the originating node a release relay process indication.

31. The method as claimed in claim 18, comprising determining at the at least one relay node based on an acknowledgement message by the destined node that the relaying of data can be released.

32. The method as claimed in claim 18, comprising allocating a radio subband resource for sole use by the destined node and allowing communications by at least one of the other nodes on other subbands.

33. A non-transitory computer readable medium embodying a computer program comprising program code means adapted to perform the method according to claim 18 when the computer program is run on a processor.

34. The non-transitory computer readable medium as claimed in claim 33, wherein the processor is for a station of a mobile communication system.

35. A communication system comprising:

an originating node comprising a transmitter configured to transmit broadcast information of a radio resource that is allocated to a destined node, wherein the transmitting comprises broadcasting said information to the destined node and at least one relay node, and wherein the radio resource comprises a reserved at least one of a radio frequency and a time resource that is receivable by the originating node and the at least one relay node;

a receiver configured to receive communications on the allocated radio resource from the destined node; and a controller configured to allocate radio resources and to control, based on communications on the allocated resource from the destined node, a data relaying process between the communication node and the destined node, said communication system further comprising a relay node comprising a receiver configured to receive information of the radio resource allocated to the destined node and communications on the allocated radio resource;

a transmitter configured to communicate with other nodes; and a controller configured to monitor for communications on the allocated resource by the destined node and to control relaying of data between the originating node and the destined node based on the monitoring.

36. The controller for a communications device, configured to monitor for communications on a radio resource that has been allocated to a destined node and to control relaying of data between an originating node and the destined node based on the monitoring.

37. The controller as claimed in claim 36, configured to monitor for a pilot signal by the destined node on the allocated radio resource, to determine a value of at least one channel characteristic based on the pilot signal, to compare the value with a threshold and to decide based on the comparison whether data is to be relayed to the destined node.

* * * * *